United States Patent
Yamamoto et al.

(10) Patent No.: US 6,496,281 B1
(45) Date of Patent: Dec. 17, 2002

(54) IMAGE FORMING APPARATUS

(75) Inventors: Shinji Yamamoto, Osaka (JP); Tetsuro Tomoe, Osaka (JP); Yukihiro Itoh, Osaka (JP); Tadahiro Kiyosumi, Osaka (JP); Eijiro Masaki, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 0 days.

(21) Appl. No.: 09/233,632

(22) Filed: Jan. 19, 1999

(30) Foreign Application Priority Data

Jan. 19, 1998  (JP) .......................................... 10-007970

(51) Int. Cl.$^7$ ................................................ H04N 1/00
(52) U.S. Cl. ..................... 358/401; 358/1.12; 358/1.15; 358/434; 347/3; 347/5; 271/9.01; 271/9.02
(58) Field of Search ................................ 358/401, 1.12, 358/1.7; 347/3, 5, 245; 271/3.13, 3.06, 3.115, 3.17, 9.01, 9.02

(56) References Cited

U.S. PATENT DOCUMENTS

| | | | | |
|---|---|---|---|---|
| 4,787,616 A | * | 11/1988 | Sasaki et al. ................. | 271/3.1 |
| 4,835,567 A | * | 5/1989 | Ogata ......................... | 271/164 |
| 4,990,941 A | * | 2/1991 | Kawai ......................... | 347/153 |
| 5,056,768 A | * | 10/1991 | Koyama ......................... | 271/3 |
| 5,255,904 A | * | 10/1993 | Taguchi et al. ............. | 271/18.1 |
| 5,258,045 A | * | 11/1993 | Yamashita ................... | 271/225 |
| 5,322,274 A | * | 6/1994 | Takahashi et al. .......... | 271/258 |
| 5,478,065 A | * | 12/1995 | Baba ......................... | 271/3.01 |
| 5,615,872 A | * | 4/1997 | Mochimaru ................. | 271/3.14 |
| 5,734,958 A | * | 3/1998 | Kazama et al. ............. | 399/363 |
| 5,826,155 A | * | 10/1998 | Kobayashi et al. ......... | 399/367 |
| 5,957,450 A | * | 9/1999 | Kida et al. ................... | 271/291 |
| 6,206,359 B1 | * | 3/2001 | Hirota et al. ............... | 271/31.5 |
| 6,236,450 B1 | * | 5/2001 | Ogura ......................... | 355/407 |
| 6,267,368 B1 | * | 7/2001 | Tomoe et al. .............. | 271/9.09 |

FOREIGN PATENT DOCUMENTS

| | | | | |
|---|---|---|---|---|
| JP | 405238603 | * | 9/1993 | ............ B65H/9/06 |
| JP | 08143188 | * | 6/1996 | ........... B65H/11/00 |

* cited by examiner

*Primary Examiner*—Edward Coles
*Assistant Examiner*—Tia A. Carter
(74) *Attorney, Agent, or Firm*—Jordan and Hamburg LLP

(57) ABSTRACT

Image forming apparatus including a paper return device for feeding a sheet of paper ejected from a paper output port opening in a main body of the apparatus to its outside back to a paper feeding port also opening in the main body to its outside. For double-sided copying operation, the sheet of paper ejected from the paper output port carrying an image on one side only is returned to the paper feeding port and fed again to an image former from the paper feeding port so that it is not necessary to provide a dedicated paper path for re-feeding the paper. The apparatus includes a paper sensor which senses the paper inserted into the paper feeding port and outputs a paper sensing signal, a discriminator for judging whether the paper return device is in an operating condition, and a paper feed controller which controls a driver for driving a paper feeder such that the paper feeder initiates a paper feed operation when the paper sensing signal is output while the paper return device is in its operating condition.

23 Claims, 11 Drawing Sheets

1

IMAGE FORMING APPARATUS

BACKGROUND OF THE INVENTION AND RELATED ART STATEMENT

The present invention relates to an image forming apparatus, such as a copying machine or a facsimile machine, having a multiple image forming capability to perform a double-sided image transfer or combined image transfer operation, for instance, as well as to a paper return device which is added to an image forming apparatus to give it the multiple image forming capability.

In one previous approach to realizing the multiple image forming capability in a copying machine, one side of each sheet of a document is successively copied, individual sheets of copying paper, each carrying a reproduced image on one side, are stacked as if in a stock, and then the other side of each sheet of the document is successively copied. This approach is known as a stock method. In another previous approach known as a non-stock method, two sides of each sheet of a document are copied in succession on two sides of each sheet of copying paper before copying on a succeeding sheet of copying paper.

In one known example of a non-stock type copying machine, a sheet of paper carrying an image reproduced on one side in an image forming section provided inside a main body of the copying machine is ejected through a paper output port, which opens to the outside of the main body of the copying machine, the ejected sheet is transferred to a paper return slot formed in the main body of the copying machine by a reversible paper transport unit which is detachably fitted to the main body, and the sheet reentered from the paper return slot is fed again to the image forming section through a refeeding path. In this construction, it is possible to provide a paper refeed mechanism for double-sided copying operation in the form of the reversible paper transport unit which is detachably fitted to the main body of the copying machine. This means that the aforementioned construction makes it possible to provide a double-sided copying mechanism as an optional unit and thereby increase the ease of maintenance.

Today's copying machines are mostly of a type that accommodates paper trays in their main bodies. The majority of this type of copying machines also have manual feed trays for loading sheets of paper to be fed directly from outside their main bodies to permit manual paper feed as is the case with the aforementioned conventional copying machines.

As will be noted from the above discussion, a conventional copying machine having the aforementioned construction usually has two paper paths for feeding paper to an image forming section from outside a main body of the copying machine. These are a refeeding path for feeding the paper transferred by a reversible paper transport unit and a manual feeding path for feeding individual sheets of paper loaded on a manual feed tray. A problem of this conventional structure is that the provision of more than one paper path for a similar purpose leads to inefficient use of available space and an increase in equipment cost.

One potential approach to achieving improved space utilization efficiency and cost reduction would be to construct a reversible paper transport unit in such a way that a paper output port of an image forming apparatus, such as a copying machine, is connected to its manual feeding port when the reversible paper transport unit is fitted to the apparatus. This construction will make it possible to use a paper return slot also as a manual feeding port and thereby combine multiple paper paths for feeding paper from outside a main body of the apparatus to an image forming section provided inside the main body into a single path.

The aforementioned conventional copying machine having two paper paths, i.e., the refeeding path and the manual feeding path, is constructed such that paper refeed means (feed roller) is caused to automatically start feeding a sheet of paper, which has been transferred by the reversible paper transport unit to the paper return slot, when an original is fed automatically, for instance, and manual feed means (feed roller) is caused to start feeding a sheet of paper each time a start button is pressed, for instance, when the paper is loaded on the manual feed tray.

If conventionally separate paper paths for feeding the paper from outside the main body of a copying machine to its image forming section provided inside the main body is combined into a single path by employing the aforementioned reversible paper transport unit which connects the paper output port to the manual feeding port when fitted to the copying machine, the same paper feed means (feed roller) is used for both manual paper feed and double-sided copying operations. Accordingly, when a sheet of paper has been fed from the reversible paper transport unit during double-sided copying mode, operation of the paper feed means must be controlled in a different way from manual paper feed mode.

SUMMARY OF THE INVENTION

It is therefore an object of the invention to achieve improved space utilization efficiency and cost reduction by combining multiple paper paths for feeding paper from outside a main body of an image forming apparatus to an image forming section provided inside the main body into a single path and to provide an image forming apparatus capable of properly controlling means for feeding the paper along the combined paper path in a double-sided copying operation.

According to the invention, an image forming apparatus comprises a main body, an image former provided inside the main body of the apparatus for forming an image on paper, a paper feeding port formed in the main body of the apparatus opening to its outside, a paper feeder for feeding paper inserted into the paper feeding port toward the image former, a paper ejector for ejecting the paper carrying the image formed by the image former to the outside of the main body of the apparatus through a paper output port formed in the main body opening to its outside, a paper sensor which senses the paper inserted into the paper feeding port and outputs a paper sensing signal, a driver for driving the paper feeder, a paper return device for feeding the paper ejected from the paper output port back to the paper feeding port, a discriminator for judging whether the paper return device is in an operating condition, and a paper feed controller for controlling the driver so that the paper feeder initiates a paper feed operation when the paper sensing signal is output while the paper return device is in its operating condition.

In this construction, when performing a double-sided copying operation, for instance, a sheet of paper ejected from the paper output port of the main body of the apparatus carrying an image on one side only is returned to the paper feeding port and fed again to the image former from the paper feeding port. Accordingly, it is not necessary to provide a dedicated paper path in the apparatus for refeeding the paper. This makes it possible to combine conventionally separate paper paths from outside the apparatus to its internal image former into a single path, and eventually achieve improved space utilization efficiency and cost reduction.

It is also possible to properly perform the paper feed operation by using the paper feeder even when the paper return device is in its operating condition by causing the paper feeder to initiate the paper feed operation when a specified period of time elapses from the time the paper sensing signal is output from the paper sensor.

These and other objects, features and advantages of the invention will become more apparent upon reading the following detailed description in conjunction with the accompanying drawings.

DETAILED DESCRIPTION OF THE PREFERRED EMBODIMENT OF THE INVENTION

An embodiment of the invention is now described with reference to the accompanying drawings. The following discussion will present some specific forms of implementing the invention in an image forming apparatus. It is by no means intended, however, to limit the technical scope of the invention by the following detailed description.

Figure 1:
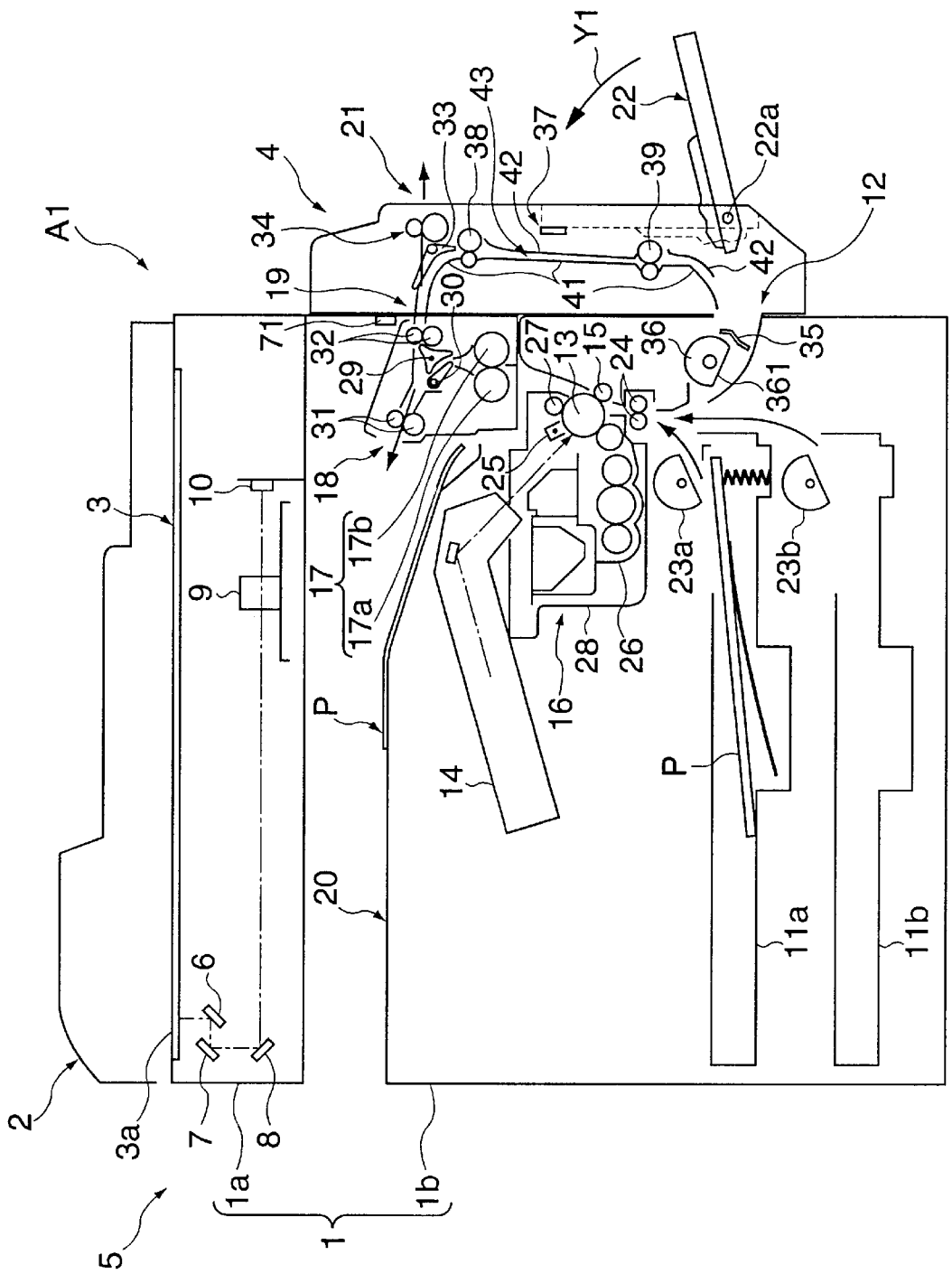
FIG. 1 is a schematic elevational view showing the internal construction of a copying machine according to a preferred embodiment of the invention.

FIG. 1 is a schematic elevational view showing the internal construction of a copying machine Al according to the embodiment of the invention.

The copying machine A1 of this embodiment is a non-stock type copying machine, which copies two sides of each sheet of a document in succession on two sides of each sheet of copying paper before copying on a succeeding sheet of copying paper during a double-sided copying operation, like the copying machine discussed in some detail in the foregoing description of the prior art.

The copying machine A1 comprises a main body 1 including an image reading section 1a which reads, or scans, an image of an original document and an image forming section 1b which forms a reproduced image on copying paper based on the original image scanned by the image reading section 1a, a reversible automatic document feeder 2 (hereinafter referred to as the RADF 2) mounted on top of an original glass plate 3 provided at the top of the image reading section 1a and a reversible paper transport unit 4 detachably mounted on a right side surface of the main body 1, as shown in FIG. 1.

The main body 1 and the RADF 2 together form an image forming apparatus while the reversible paper transport unit 4 constitutes a paper return device. First, the construction of the RADF 2 and the image reading section 1a and their image scanning operation are generally described. Since neither the RADF 2 nor the image reading section 1a plays an essential part in the invention, the following discussion provides only their brief description.

The RADF 2 is so constructed that multiple sheets of a document can be loaded together and the document loaded in the RADF 2 can be automatically fed one sheet after another to a scanning area 3a which will be described later. A description of the detailed construction and document feeding operation of the RADF 2 is not provided in this Specification.

The image reading section 1a comprises the aforementioned original glass plate 3 and an optical scanning system 5 which illuminates a sheet of the document placed on the original glass plate 3 or a sheet of the document automatically fed over the scanning area 3a, which is located along an edge of the original glass plate 3, with a scanning light beam and receives light reflected from the document. The optical scanning system 5 includes a fluorescent lamp which is not unillustrated, mirrors 6, 7 and 8 for guiding light reflected from a side of the original illuminated by the fluorescent lamp, a lens 9 and a line sensor 10 which receives the reflected light.

When a sheet of the document is transferred over the scanning area 3a by the RADF 2, one side of the sheet is illuminated and scanned by the optical scanning system 5 whose constituent elements are fixed in positions shown in FIG. 1. When copying a bound printed material like a book which is directly placed in a fixed position on the original glass plate 3 without using the RADF 2, part of the optical scanning system 5, e.g., the mirror 6, is moved from left to right (as illustrated in FIG. 1) to illuminate and scan each page of the printed material to be copied.

Next, the construction of the image forming section 1b and the reversible paper transport unit 4 and their image forming operation are generally described.

The image forming section 1b comprises paper cassettes 11a, 11b for holding paper stacks, the paper cassettes 11a, 11b being accommodated inside the main body 1 of the copying machine A1 in a manner that they can be drawn out of the main body 1, a manual feeding port 12 which permits an operator to manually feed sheets of copying paper P from outside the main body 1 of the copying machine A1, a laser optical system 14 which projects a laser beam whose intensity varies in accordance with an input to the line sensor 10 of the optical scanning system 5 onto a photosensitive drum 13, an image forming assembly 16 which transfers a toner image formed on the photosensitive drum 13 onto the paper P, a fixing roller pair 17 including a heating roller 17a and a pressure roller 17b for fixing the toner image onto the paper P, a paper delivery port 18 through which the paper P is ejected after it has passed through the fixing roller pair 17, a paper output port 19, a paper delivery table 20 for receiving each sheet of paper P ejected through the paper delivery port 18, and various paper transport means (which will be discussed later in detail) for transporting the paper P along the aforementioned elements.

The image forming assembly 16 includes a static charger 25, a developing unit 26, an image transfer roller 15 and a cleaning roller 27 which are arranged in this order around the photosensitive drum 13 along its turning direction. The image forming assembly 16 thus constructed focuses the laser beam emitted by the laser optical system 14 onto a curved outer surface of the photosensitive drum 13 which has been uniformly charged by the static charger 25 to form an electrostatic latent image on the photosensitive drum 13, develops the electrostatic latent image into a toner image in the developing unit 26, transfers the toner image onto the paper P by means of the image transfer roller 15 and then collects the excess toner left on the surface of the photosensitive drum 13 by means of the cleaning roller 27. Among the aforementioned elements of the image forming assembly 16, the elements other than the image transfer roller 15 are assembled together to form a single structure which is hereinafter referred to as an image forming unit 28. The image forming unit 28 is mounted so that it can be drawn out of the main body 1 of the copying machine A1 in its frontward direction.

There is provided a detecting switch 35 close to the manual feeding port 12. The detecting switch 35 becomes ON when pushed by the leading edge of a sheet of paper P to thereby sense the paper P loaded on the manual feed tray 22. There is provided a feed roller 36 immediately on the inside of the manual feeding port 12, the feed roller 36 having a flat portion 361 formed by cutting part of a curved outer surface of the feed roller 36 to give it a semicircular cross-sectional shape.

Feed rollers 23a, 23b, each having a semicircular cross-sectional shape, are provided near the right ends of the paper cassettes 11a, 11b, respectively. Further, there is provided a registration roller pair 24 between the feed rollers 36, 23a, 23b and the image forming assembly 16 for transferring the paper P fed from the feed roller 36, 23a or 23b to the image forming assembly 16 with specific timing. In the aforementioned construction, the manual feeding port 12 constitutes a paper feeding port of the main body 1 of the copying machine A1, the paper output port 19 constitutes a paper output port of the main body 1, the image forming assembly 16 and the fixing roller pair 17 together constitute image forming means, the detecting switch 35 constitutes a paper spanor, the feed roller 36 constitutes manual feed means, and the registration roller pair 24 constitutes secondary feed means.

The reversible paper transport unit 4 includes a paper return guideway 43 which is formed of paper guides 41, 42 and other elements for guiding each sheet of paper P as well as a pair of transfer rollers 38 and a pair of transfer rollers 39 provided at appropriate positions along the paper guides 41, 42 to feed the paper P ejected through the paper output port 19 formed in the main body 1 back to the manual feeding port 12 formed in the main body 1. In this embodiment, the transfer rollers 38, 39 together constitute paper feeding means.

In this construction of the copying machine A1, the paper P ejected from the paper output port 19 of the main body 1 is transferred to the manual feeding port 12 and fed again to the image forming assembly 16 in a manner similar to ordinary manual paper feed operation. It would be recognized from the foregoing discussion that the copying machine A1 of this embodiment is not provided in its main body 1 with any extra paper path for feeding the paper P from outside the main body 1 up to the image forming assembly 16 other than a manual feeding path used in the aforementioned manual paper feed operation.

As the reversible paper transport unit 4 of the copying machine A1 is constructed as described above in this embodiment, it is possible to combine conventionally separate paper paths from outside the main body 1 to its internal image forming assembly 16 into a single path, and this makes it possible to achieve improved space utilization efficiency and cost reduction.

The reversible paper transport unit 4 is further provided with a paper outlet 21 from which the paper P ejected through the paper output port 19 of the main body 1 is discharged without being transferred to the manual feeding port 12 and a manual feed tray 22 used when manually feeding the paper P into the manual feeding port 12. The manual feed tray 22 can be swung in the direction of arrow Y1 shown in FIG. 1 about a supporting point 22a. As a consequence, the manual feed tray 22 can be retracted in a side wall of the reversible paper transport unit 4 when not in use as shown by broken lines in FIG. 1.

The reversible paper transport unit 4 further includes a detecting switch 37 which becomes ON to sense that the manual feed tray 22 has been retracted when the manual feed tray 22 is swung up and fitted in the side wall of the reversible paper trans port unit 4.

There is provided a detecting switch 71 in a joint area between the main body 1 of the copying machine A1 and the reversible paper transport unit 4. This detecting switch 71 becomes ON when the reversible paper transport unit 4 is attached to the main body 1 to sense that the reversible paper transport unit 4 has been fitted to the main body 1.

Figure 2:
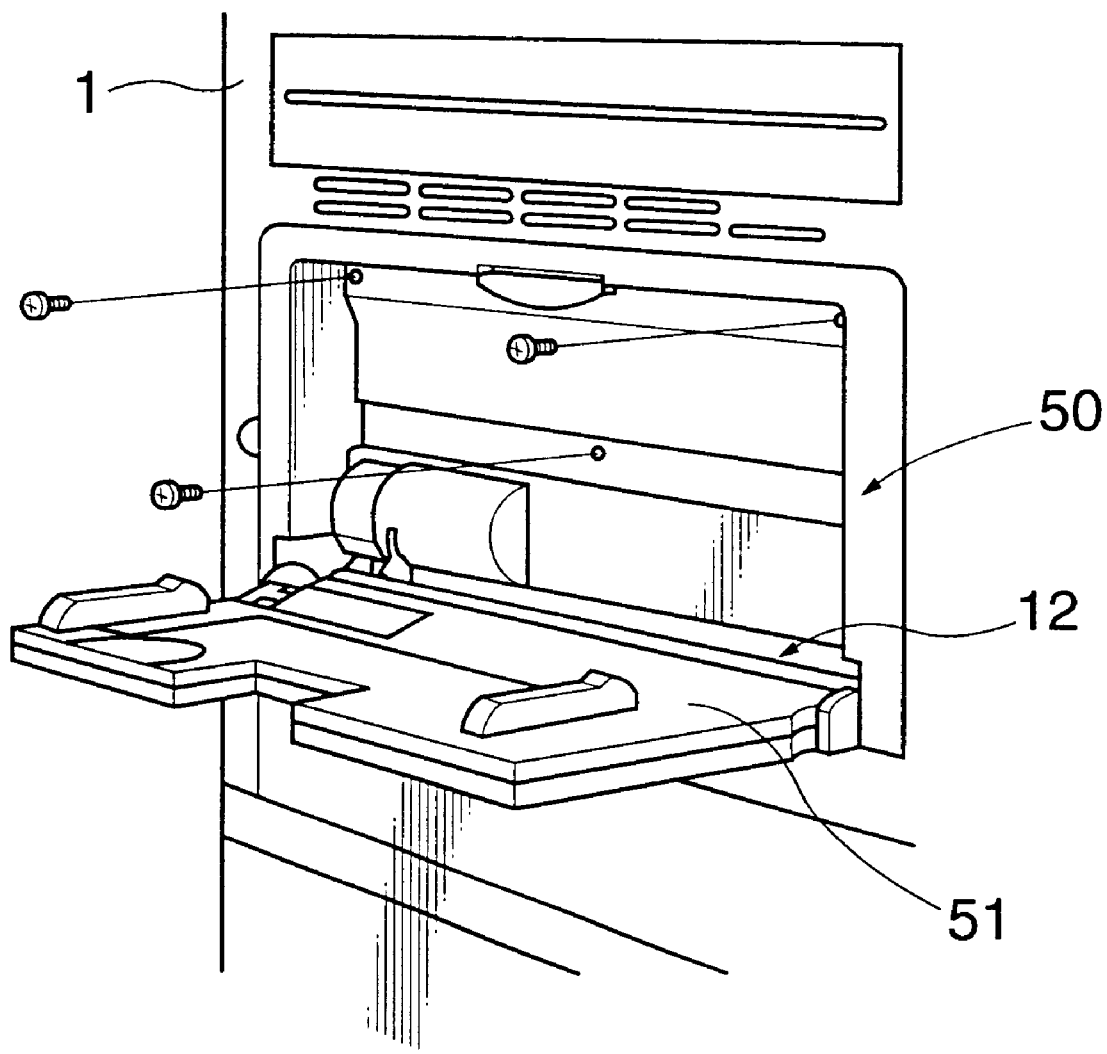
FIGS. 2 and 3 are perspective diagrams showing how a manual feed tray is set in position in a main body of the copying machine.
Figure 3:
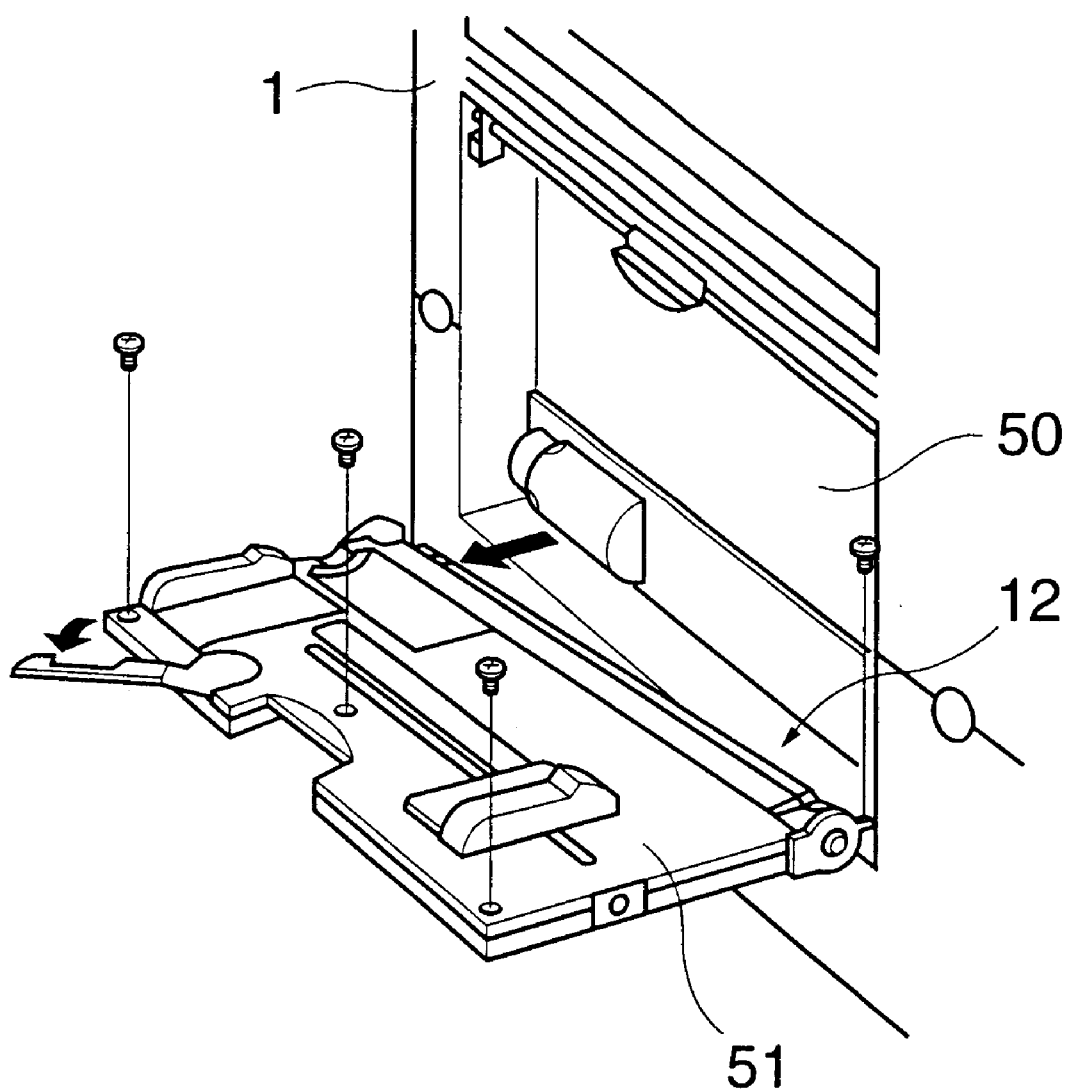
Figure 4:
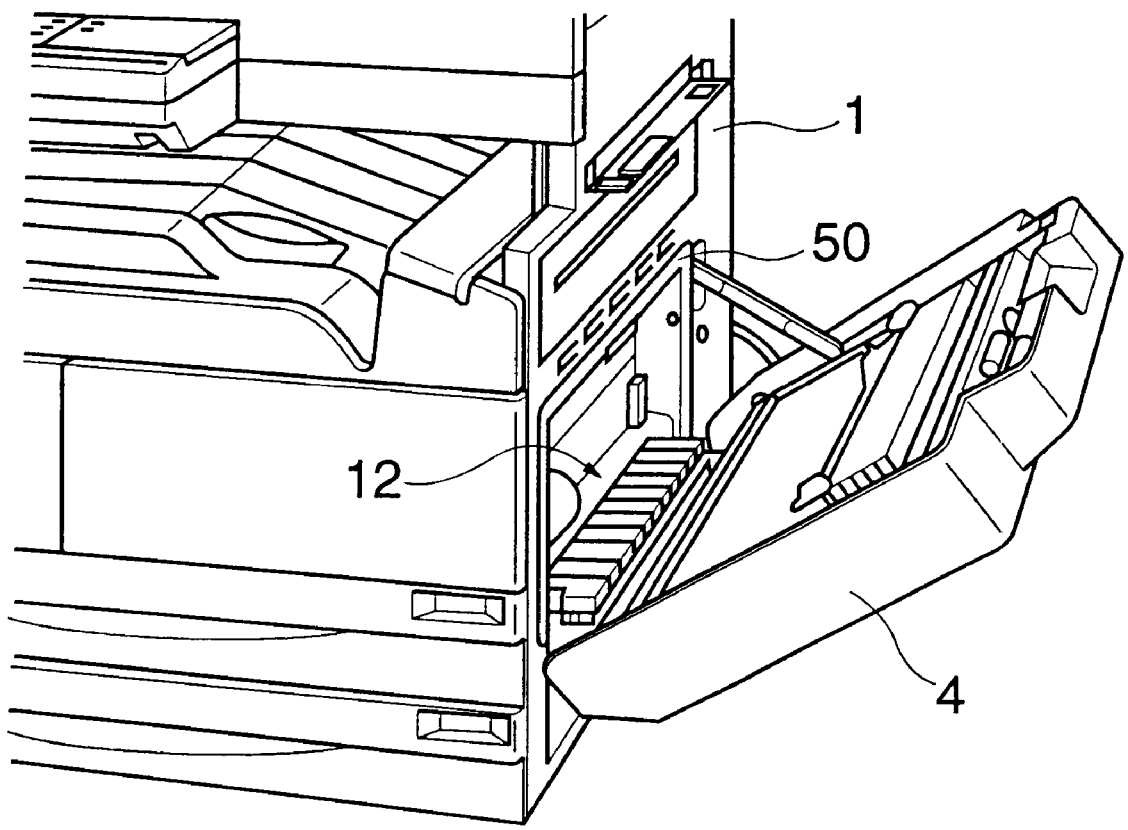
FIG. 4 is a perspective diagram showing how a reversible paper transport unit is fitted to the main body of the copying machine in place of the manual feed tray.

Referring now to FIGS. 2 through 4, a structure for fitting a second manual feed tray 51 and the reversible paper transport unit 4 to the main body 1 of the copying machine A1 is described. FIGS. 2 and 3 are perspective diagrams showing how the manual feed tray 51 is set in position in the main body of the copying machine A1, and FIG. 4 is a perspective diagram showing how the reversible paper transport unit 4 is fitted to the main body 1 of the copying machine A1 in place of the manual feed tray 51.

As shown in FIG.. 2, there is attached a unit mounting part 50 to a side wall of the main body 1 of the copying machine A1 where the manual feeding port 12 is provided, and the manual feed tray 51 for loading sheets of paper P to be fed directly from outside the main body 1 is attached to the unit mounting part 50. The manual feed tray 51 constitutes a paper loading table and can be retracted in the side wall of the main body 1 in a manner similar to what has been described above with reference to the manual feed tray 22. When the manual feed tray 51 is retracted in the side wall of the main body 1, the manual feeding port 12 is closed by the manual feed tray 51.

When using the reversible paper transport unit 4, it is fitted to the copying machine A1 after removing the manual feed tray 51 from the main body 1 so that the manual feeding port 12 is not closed off. To make this possible, the manual feed tray 51 can be detached from the unit mounting part 50 by a procedure depicted in FIG. 3 and the reversible paper transport unit 4 can be attached to the unit mounting part 50, from which the manual feed tray 51 has been removed, as depicted in FIG. 4.

As shown in the foregoing discussion, the provision of the unit mounting part 50 makes it possible to selectively fit the manual feed tray 51 or the reversible paper transport unit 4 to the main body 1 of the copying machine A1.

Figure 5:
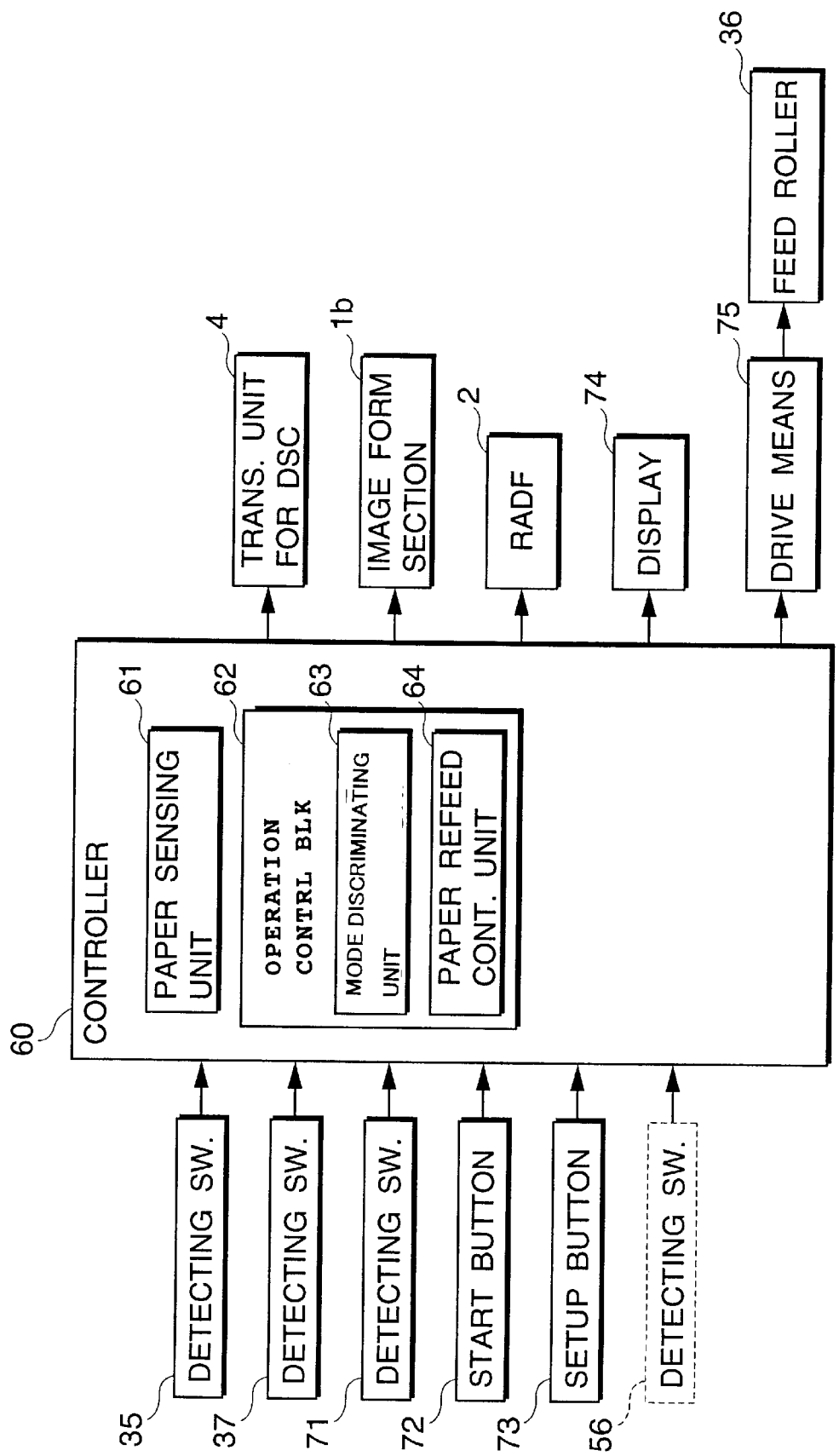
FIG. 5 is a block diagram of a control circuit of the copying machine.

FIG. 5 is a block diagram of a control circuit of the copying machine A1. Referring to FIG. 5, a controller 60 formed of a central processing unit (CPU) and other components controls the operation of individual elements of the copying machine A1 and performs the following functions:

The function as tray position sensing means for judging whether the manual feed tray 22 is retracted into the reversible paper transport unit 4 according to on/off states of the detecting switch 37;

The function as transport unit sensing means for judging whether the reversible paper transport unit 4 is mounted according to on/off states of the detecting switch 71;

The function as paper refeed control means for controlling individual elements of the reversible paper transport unit 4 only when it is fitted to the main body 1 of the copying machine A1 and the manual feed tray 22 is retracted into the reversible paper transport unit 4;

The function as operation discriminating means for discriminating contents of individual operational commands entered by operating such controls as a start button 72 for initiating a copying operation and setup buttons 73 for specifying the number of copies, selecting double-sided copy mode and entering other settings that are provided at appropriate positions of the main body 1 of the copying machine A1; and The function as display control means for controlling data contents presented on a display 74 constructed of a liquid crystal display (LCD) panel, for example, which is provided at an appropriate position of the main body 1 of the copying machine A1 and displays the contents of settings entered by using the setup buttons 73, warning messages and other information.

Further, the controller 60 includes functional blocks as shown in FIG. 5. These are a paper sensing block 61 and a copying operation control block 62. The paper sensing block 61 of the controller 60 senses whether any copying paper P is present at the manual feeding port 12 according to on/off states of the detecting switch 35 provided at the manual feeding port 12. More specifically, the paper sensing block 61 judges whether any paper P is loaded on the manual feed tray 22 when the manual feed tray 22 is set in its swung-out position as shown by solid lines in FIG. 1, whereas the paper sensing block 61 judges whether there is any sheet of paper P fed back by the reversible paper transport unit 4 to the manual feeding port 12 during the double-sided copying operation.

The copying operation control block 62 of the controller 60 controls the individual elements of the copying machine A1, such as the image forming section 1b and the RADF 2, so that they begin to operate when the start button 72 is pressed in accordance with the settings entered by using the setup buttons 73. The copying operation control block 62 further includes such functional blocks as a mode discriminating block 63 and a paper feed control block 64.

The mode discriminating block 63 judges whether double-sided copying mode is selected, that is, the reversible paper transport unit 4 is in its operating state, or manual feed mode is selected to copy on the paper P loaded on the manual feed tray 22 in accordance with the settings entered by using the setup buttons 73.

The pa per feed control block 64 performs the following functions:

(1) The function of initiating a positive paper feed operation in the manual feed mode, wherein if the start button 72 is pressed after it has been judged that a sheet of paper P is present at the manual feeding port 12, a driver 75 including a drive motor which is connected to a roller shaft of the feed roller 36 is activated to feed the paper P by the feed roller 36;

(2) The function of initiating the positive paper feed operation in the double-sided copying mode, wherein when a specified period of time elapses after it has been judged that a sheet of paper P is present at the manual feeding port 12, the driver 75 is activated to feed the paper P by the feed roller 36; and (3) The function of stopping the feed roller 36 with its flat portion 361 directed toward the paper P when the registration roller pair 24 has begun rotating, and switching the paper transport means from the positive paper feed operation to a negative paper feed operation.

The positive and negative paper feed operations are now described referring to FIG. 1.

A sheet of paper P placed at the manual feeding port 12 is first fed by the feed roller 36 up to the registration roller pair 24 and stopped there in a somewhat slackened state with the leading edge of the sheet nipped between two rollers of the registration roller pair 24. This form of paper feed in which the paper P is fed by a pushing, or pulling, force applied by the outer surface of the feed roller 36 is referred to as the positive paper feed operation.

Figure 6:
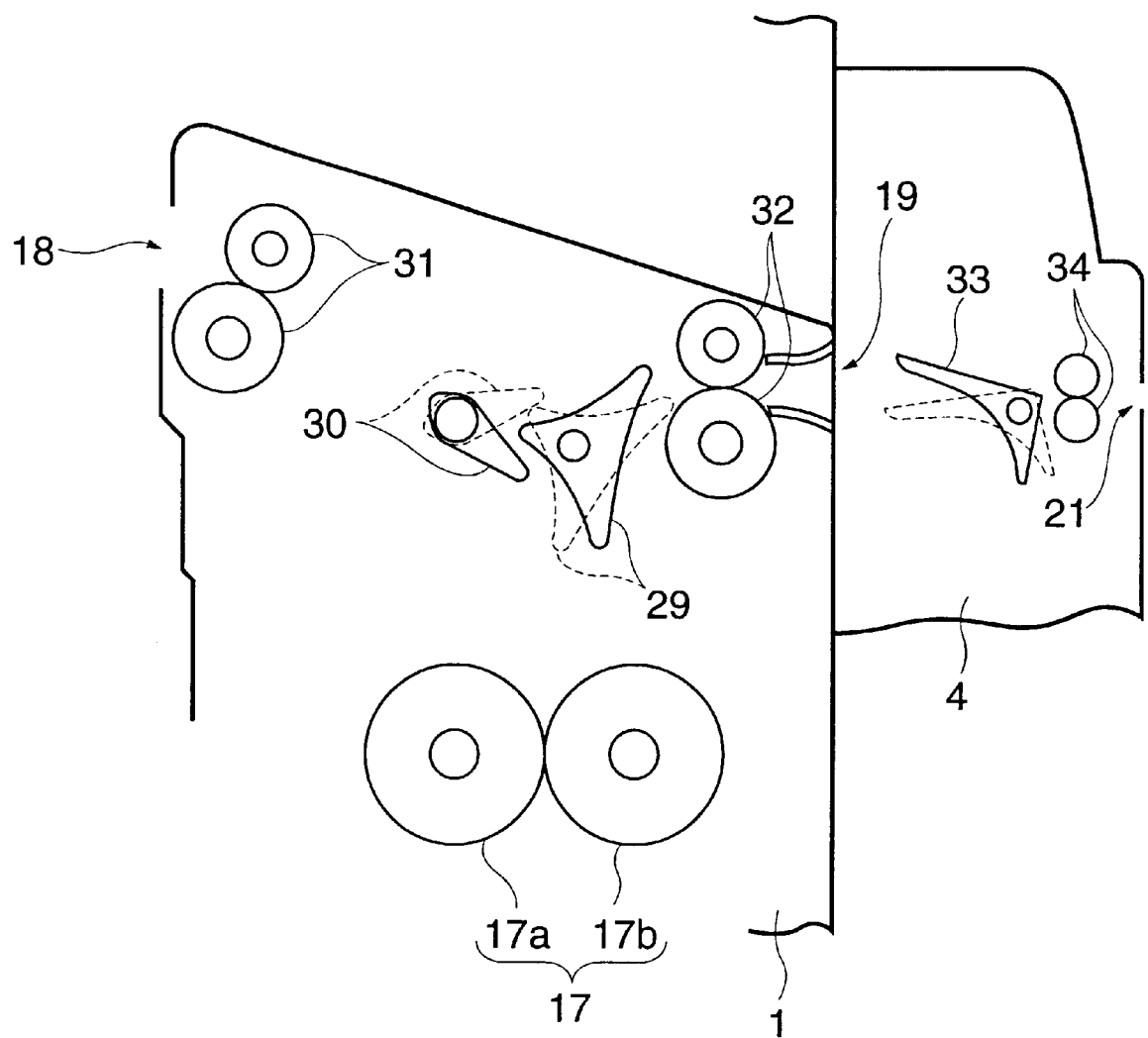
FIG. 6 is a partially enlarged view of FIG. 1 particularly showing a structure around guiding pawls.

The registration roller pair 24 begins to rotate in synchronism with operating timing of the image forming assembly 16 to further feed the sheet toward the image forming assembly 16. At this time, the feed roller 36 remains stopped with its flat portion 361 directed toward the sheet to prevent such problems as unstable paper feeding speed of the registration roller pair 24, deviation of image transfer timing or misregistration of copied images due to a frictional force occurring between the outer surface of the feed roller 36 and the sheet. As a consequence, the sheet can pass through a gap formed by the flat portion 361 of the feed roller 36 and an image is transferred onto the sheet without any misregister. This form of paper feed in which the paper P is allowed to be fed by the registration roller pair 24 with no pushing, or pulling, force exerted by the feed roller 36 whose flat portion 361 is directed toward the paper P is referred to as the negative paper feed operation. Referring now to FIGS. 1 and 6, image forming operation performed by the image forming section 1b and paper transport operation performed by the reversible paper transport unit 4 are briefly described. FIG. 6 is a partially enlarged view of FIG. 1 particularly showing a structure around guiding pawls 29, 30. A description of image scanning operation which is performed by the image reading section 1a is not provided in this Specification.

Operation performed when an image is copied only on one side of a sheet of paper P is described at first.

When the start button 72 shown in FIG. 5 is pressed, an uppermost sheet of paper P is pulled out of the paper cassette 11a (or 11b) by the rotating feed roller 23a (or 23b) having a cut portion on its curved outer surface. The leading edge of the paper P drawn out of the paper cassette 11a (or 11b) hits against the registration roller pair 24. The registration roller pair 24 temporarily holds the paper P in this position and sends it upstream toward the image forming assembly 16 with specific timing.

In the image forming assembly 16, a toner image is transferred onto the side of the paper P facing the photosensitive drum 13 through the previously described process as the paper P passes between the photosensitive drum 13 and the image transfer roller 15. The paper P which has passed through the image forming assembly 16 is transferred to the fixing roller pair 17 and the toner image is fixed, or fused, onto the aforementioned side of the paper P as it passes between the heating roller 17a and the pressure roller 17b. The paper P which has passed through the fixing roller pair 17 is then transferred toward the paper delivery port 18 if the paper P is to be ejected face down onto the paper delivery table 20 with the printed side of the paper P facing downward, toward the paper output port 19 if the paper P is to be ejected face up with the printed side of the paper P facing upward.

Whether the paper P is transferred toward the paper delivery port 18 or the paper output port 19 is determined by the positions of the guiding pawls 29, 30. More specifically, when the guiding pawls 29, 30 are set in positions shown by the solid lines in FIG. 6, the paper P is guided toward the paper delivery port 18, and when the guiding pawls 29, 30 are set in the positions shown by broken lines in FIG. 6, the paper P is guided toward the paper output port 19.

The paper P guided toward the paper delivery port 18 is ejected by a pair of output rollers 31 through the paper delivery port 18 onto the paper delivery table 2 0 face down. On the other hand, the paper P guided toward the paper output port 19 is pushed out through the paper output port 19 by a pair of output rollers 32 and transferred into the reversible paper transport unit 4.

The paper P transferred into the reversible paper transport unit 4 is guided by the guiding pawl 33 which is set in the position shown by broken lines in FIG. 6 and is ejected by a pair of output rollers 34 through the paper outlet 21. The paper P ejected through the paper outlet 21 is stacked face up on an unillustrated finisher, for instance, which is provided as a separate unit. When the reversible paper transport unit 4 is not fitted to the main body 1 of the copying machine A1, the paper P ejected face up through the paper output port 19 is directly stacked face up on an unillustrated finisher, for instance.

If it is desired to manually feed a sheet of paper P from the manual feed tray 22, and not from either of the paper cassettes 11a, 11b, the paper P is loaded on the manual feed tray 22 which is fitted to the reversible paper transport unit 4 in such a way that the leading edge of the paper P is inserted into the manual feeding port 12 formed in the main body 1 of the copying machine A1. In this case, the detecting switch 35 senses that the paper P has been loaded on the manual feed tray 22 as the detecting switch 35 is pushed by the leading edge of the paper P. When the start button 72 is pressed subsequently, the controller 60 provided in the main body 1 of the copying machine A1 causes the feed roller 36 to begin rotating upon receiving a paper sensing signal from the detecting switch 35 and a start signal from the start button 72. As a result of the foregoing operation, an uppermost sheet of paper P is pulled out of the manual feed tray 22 and is transferred toward the registration roller pair 24.

Operation performed when the feed roller 36 has been caused to rotate is the same as the aforementioned operation performed when the paper P is supplied from the paper cassette 11a or 11b. An operational sequence performed after the detecting switch 35 has sensed the paper P up to a point where the feed roller 36 begins to rotate will be described later with reference to FIG. 8.

If it is desired to manually feed sheets of paper P when the reversible paper transport unit 4 is not fitted to the main body 1 of the copying machine A1, the manual feed tray 51 fitted directly to the main body 1 as illustrated in FIG. 2 can be used.

Operation performed for copying original images on both sides of a sheet of paper P is now described.

It is a first precondition for performing a double-sided copying operation that the reversible paper transport unit 4 is fitted to the main body 1 of the copying machine A1. Whether or not the reversible paper transport unit 4 is fitted to the main body 1 is sensed by the detecting switch 71 provided in the joint area between the main body 1 and the reversible paper transport unit 4.

Although it is possible to manually feed sheets of paper P even when the reversible paper transport unit 4 is fitted to the main body 1 of the copying machine A1 of this embodiment, it is undesirable to manually feed the paper P in a double-sided copying operation. A major reason for this is as follows. When a sheet of paper P carrying a copied image on its one side is ejected from the paper output port 19 of the main body 1 of the copying machine A1, it is transferred to the manual feeding port 12 by the reversible paper transport unit 4 during the double-sided copying operation. If, however, another sheet of paper P is already set in the manual feeding port 12, the sheet carrying the copied image on one side fed from the paper output port 19 would pass over the sheet manually set in the manual feeding port 12. Should this occur, the sheet already set in the manual feeding port 12 will be displaced from its correct feed position due to a frictional force caused by the sheet transferred by the reversible paper transport unit 4 down from the paper output port 19. Another reason is that if the sheet of paper P manually set in the manual feeding port 12 is smaller than the sheet carrying the copied image on one side fed from the paper output port 19, there is formed a difference in paper thickness between an area where the two sheets overlap and an area where they do not overlap, and this is likely to cause unstable paper transport operation. Although no problem will arise if the sheet of paper P manually set in the manual feeding port 12 is completely fed into the main body 1 of the copying machine A1 before the sheet carrying the copied image on one side fed from the paper output port 19 reaches the manual feeding port 12, it is difficult to check in advance whether this will be the case.

Accordingly, a second precondition for performing a double-sided copying operation is that there exists no paper P already set in the manual feeding port 12. In the copying machine A1 of this embodiment, a judgment as to whether this second precondition is met is made by sensing whether or not a sheet of paper P is ready to be manually set in position. More particularly, if a tray position sensing signal output from the detecting switch 37, which is provided for sensing whether the manual feed tray 22 is retracted in the side wall of the reversible paper transport unit 4, is ON, the controller 60 judges that it is impossible to set any paper P by manual operation and thus the second precondition is satisfied. This makes it possible to prevent the double-sided copying operation from being accidentally initiated when there is already a sheet of paper P manually set in the manual feeding port 12.

Now, the sequence of the double-sided copying operation is described in detail. While an operator is required to make necessary settings by operating the setup buttons 73 before initiating a double-sided copying operation, the controller 60 controls the copying machine A1 to inhibit such settings unless a signal from the detecting switch 71 which senses that the reversible paper transport unit 4 is fitted to the main body 1 and the aforementioned tray position sensing signal from the detecting switch 37 have already been received. This means that the operator is allowed to make the settings for the double-sided copying operation only if both of the aforementioned first and second preconditions are fulfilled.

Figure 7:
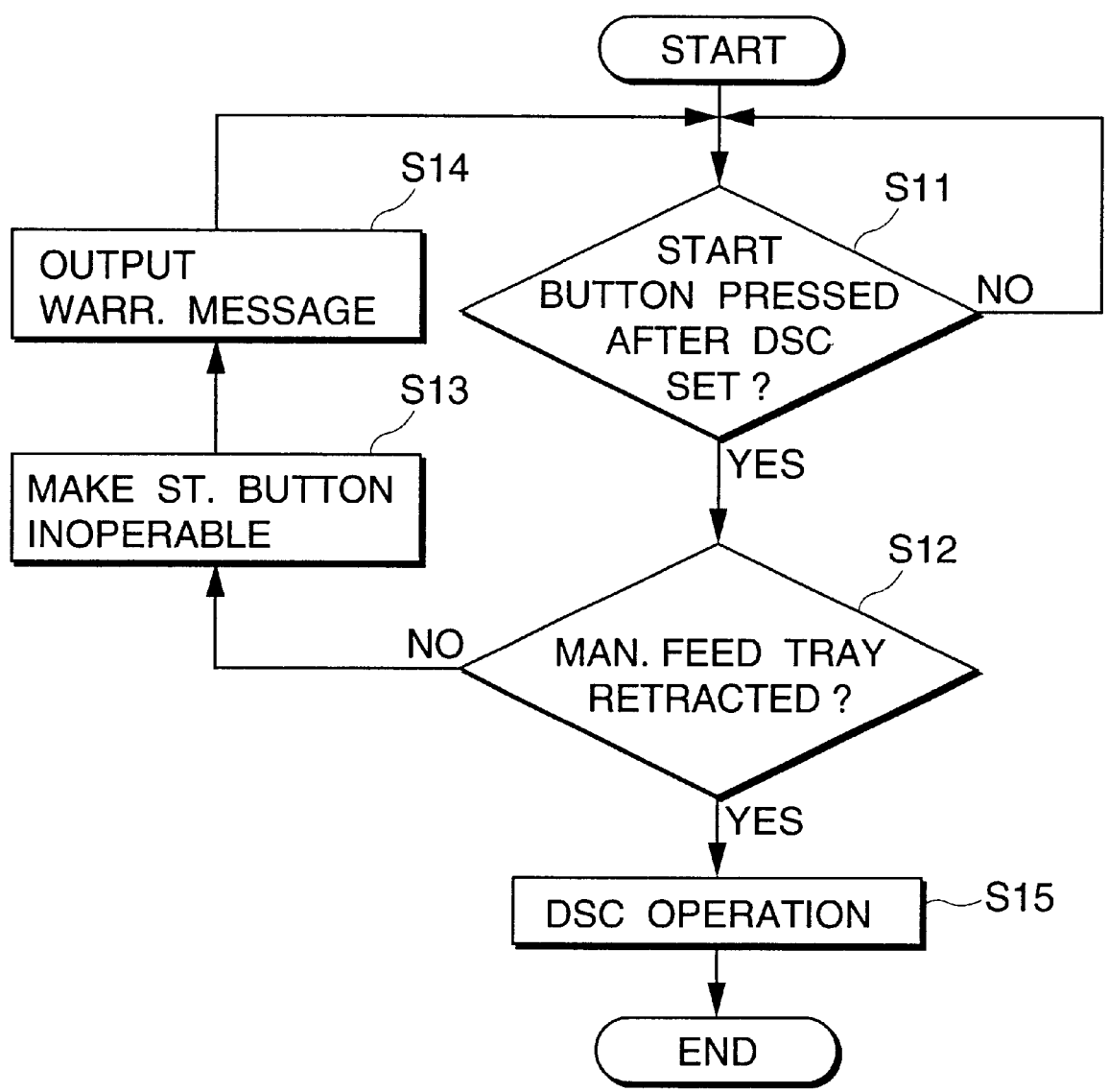
FIG. 7 is a flowchart showing an operational sequence carried out before a double-sided copying operation is commenced.

FIG. 7 is a flowchart showing an operational sequence carried out before the double-sided copying operation is commenced.

Referring to this flowchart, when the operator presses the start button 72 (Yes in step S11) after completing the settings for the double-sided copying operation using the setup buttons 73 of the copying machine A1 which is readily fitted with the reversible paper transport unit 4, it is judged whether the manual feed tray 22 is in its retracted position depending on whether the tray position sensing signal from the detecting switch 37 is present or not (step S12). If the manual feed tray 22 is in the retracted position (Yes in step S12), the double-sided copying operation which will be described later is commenced (step S15). On the other hand, if the manual feed tray 22 is in its unfolded position (Yes in step S12), the start button 72 is made inoperative (step S13) and a warning message reading "Close the manual feed tray", for instance, is shown on the display 74 (step S14). In this case, the operation flow returns to step S11.

When the double-sided copying operation of step S15 begins, a sheet of paper P is pulled out of the paper cassette 11a or 11b and transferred upward through the image forming assembly 16 and the fixing roller pair 17. An image is copied on one side of the sheet in this process in a manner similar to the aforementioned single-sided copying operation. The paper P which has passed through the fixing roller pair 17 is guided toward the paper delivery port 18 by the guiding pawls 29, 30 set in the positions shown by the solid lines in FIG. 6 and advanced to the outside of the paper delivery port 18 by the output rollers 31. The output rollers 31 are caused to stop rotating while gripping a portion of the paper P close to its trailing edge. This means that the paper P is pushed out face down onto the paper delivery table 20 with the trailing edge portion of the paper P still left inside the paper delivery port 18.

Subsequently, the guiding pawls 29, 30 are set in the positions shown by the broken lines in FIG. 6 and the output rollers 31 are caused to rotate in a reverse direction to pull the paper P inward through the paper delivery port 18. The paper P is now guided toward the paper output port 19 and pushed out by the output rollers 32. As a result of the above-described switchback operation, the paper feeding direction is reversed and the paper P is turned upside down.

The paper P ejected through the paper output port 19 is transferred into the reversible paper transport unit 4. The paper P thus transferred into the reversible paper transport unit 4 is guided by the guiding pawl 33 which is set in the position shown by the broken lines in FIG. 6 and carried downward through the transfer rollers 38, the paper return guideway 43 and the transfer rollers 39 until the leading edge of the paper P is inserted into the manual feeding port 12. The leading edge of the paper P is detected by the detecting switch 35 when inserted into the manual feeding port 12. Upon receiving the paper sensing signal from the detecting switch 35, the controller 60 causes the feed roller 36 to start rotating with specific timing. An operational sequence carried out from the detection of the paper P by the detecting switch 35 up to the start of rotation of the feed roller 36 will be described later with reference to FIG. 8.

When the feed roller 36 begins to rotate, the paper P is transferred toward the registration roller pair 24. As the paper P is further transferred through the image forming assembly 16 and the fixing roller pair 17 subsequently, another image is copied on the reverse side of the paper P. The paper P which has passed through the fixing roller pair 17 is guided by the guiding pawls 29, 30 toward the paper delivery port 18 or the paper output port 19 and eventually discharged.

While the foregoing discussion has illustrated the sequence of the double-sided copying operation, the sequence can be used in its slightly modified form to perform a combined image transfer operation in which more than one image is copied on one side of a single sheet of paper P. This is achieved by refeeding the paper P through the reversible paper transport unit 4 without turning the paper P upside down in the above-described switchback operation. More particularly, the combined image transfer operation is executed by guiding the paper P which has passed through the fixing roller pair 17 toward the paper output port 19 with the guiding pawls 29, 30 set in the positions shown by the broken lines in FIG. 6.

Figure 8:
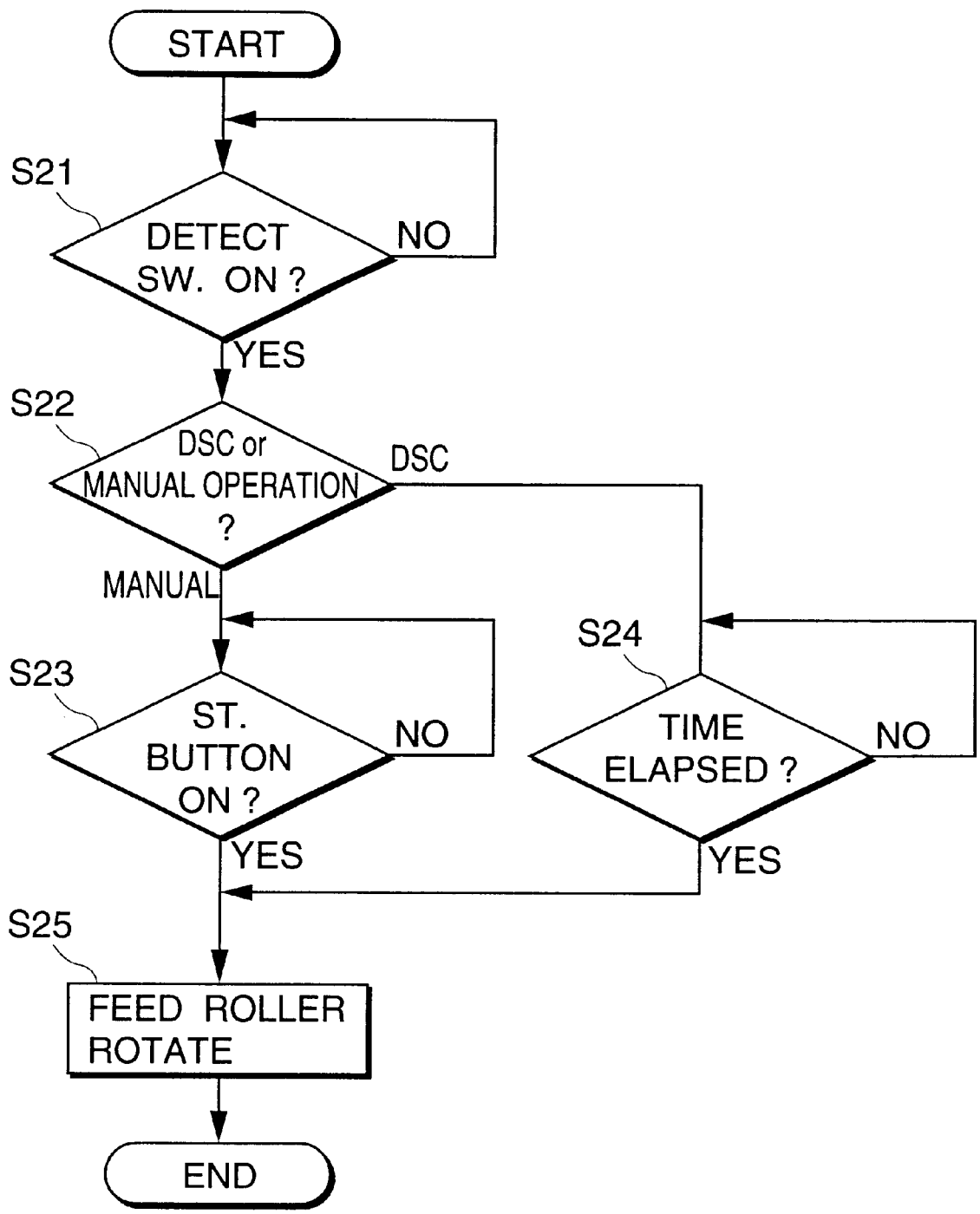
FIG. 8 is a flowchart showing an operational sequence carried out since a detecting switch has detected paper until a feed roller begins to rotate.

FIG. 8 is a flowchart showing the operational sequence carried out since the detecting switch 35 has detected the paper P until the feed roller 36 begins to rotate.

Referring to this flowchart, when the paper P at the manual feeding port 12 is detected by the detecting switch 35 (Yes in step S21), it is judged whether the double-sided copying mode or manual feed mode is selected (step S22). If the manual feed mode is selected (Manual in step S22), the feed roller 36 is caused to rotate (step S25) when the start button 72 becomes ON (Yes in step S23).

On the other hand, if the double-sided copying mode is selected (DSC in step S22), the feed roller 36 is held in a standby condition until a specified period of time elapses after the detecting switch 35 has detected the paper P (step S24). When this period of time has elapsed (Yes in step S24), the feed roller 36 is caused to rotate (step S25).

This form of control is needed because the copying machine A1 has the manual feeding path in a portion of the paper return guideway 43 which is provided for the double-sided copying operation. Since the feed roller 36 is not driven to rotate all the time but only when it becomes necessary to advance the paper P by a specified length, it is necessary to cause the feed roller 36 to automatically rotate when the paper P has been detected in the double-sided copying operation.

As thus far described, the copying machine A1 of this embodiment is constructed such that the reversible paper transport unit 4 detachably fitted to the main body 1 of the copying machine A1 feeds the paper P ejected from the paper output port 19 to the manual feeding port 12. In the double-sided copying operation, the paper P is transferred again to the image forming assembly 16 through the same portion of the paper return guideway 43 as used in the manual paper feed operation. In this construction, it is not necessary to provide any extra paper path for feeding the paper P from outside the main body 1 up to the image forming assembly 16 other than the manual feeding path used in the aforementioned manual paper feed operation in the main body 1 of the copying machine A1. Thus, the construction of the copying machine A1 makes it possible to combine conventionally separate paper paths from outside the main body 1 to its internal image forming assembly 16 into a single path, and eventually achieve improved space utilization efficiency and cost reduction. Furthermore, it is possible to properly perform the paper feed operation by the feed roller 36 which works as the manual feed means in the copying machine A1 of this embodiment by causing the feed roller 36 to commence the paper feed operation when the specified period of time elapses after the detecting switch 35 has detected the paper P in the double-sided copying mode.

While the invention has been described with reference to its preferred embodiment, the invention is not limited to the foregoing embodiment but may be applied in many varied forms thereof.

While the feed roller 36 is a roller having the flat portion 361, and the copying machine A1 of the foregoing embodiment performs the positive paper feed operation by turning the feed roller 36 to feed each sheet of paper P with the curved outer surface of the feed roller 36 as well as the negative paper feed operation by stopping the feed roller 36 with its flat portion 361 directed toward the paper P, the invention is not limited to this arrangement.

Figure 9:
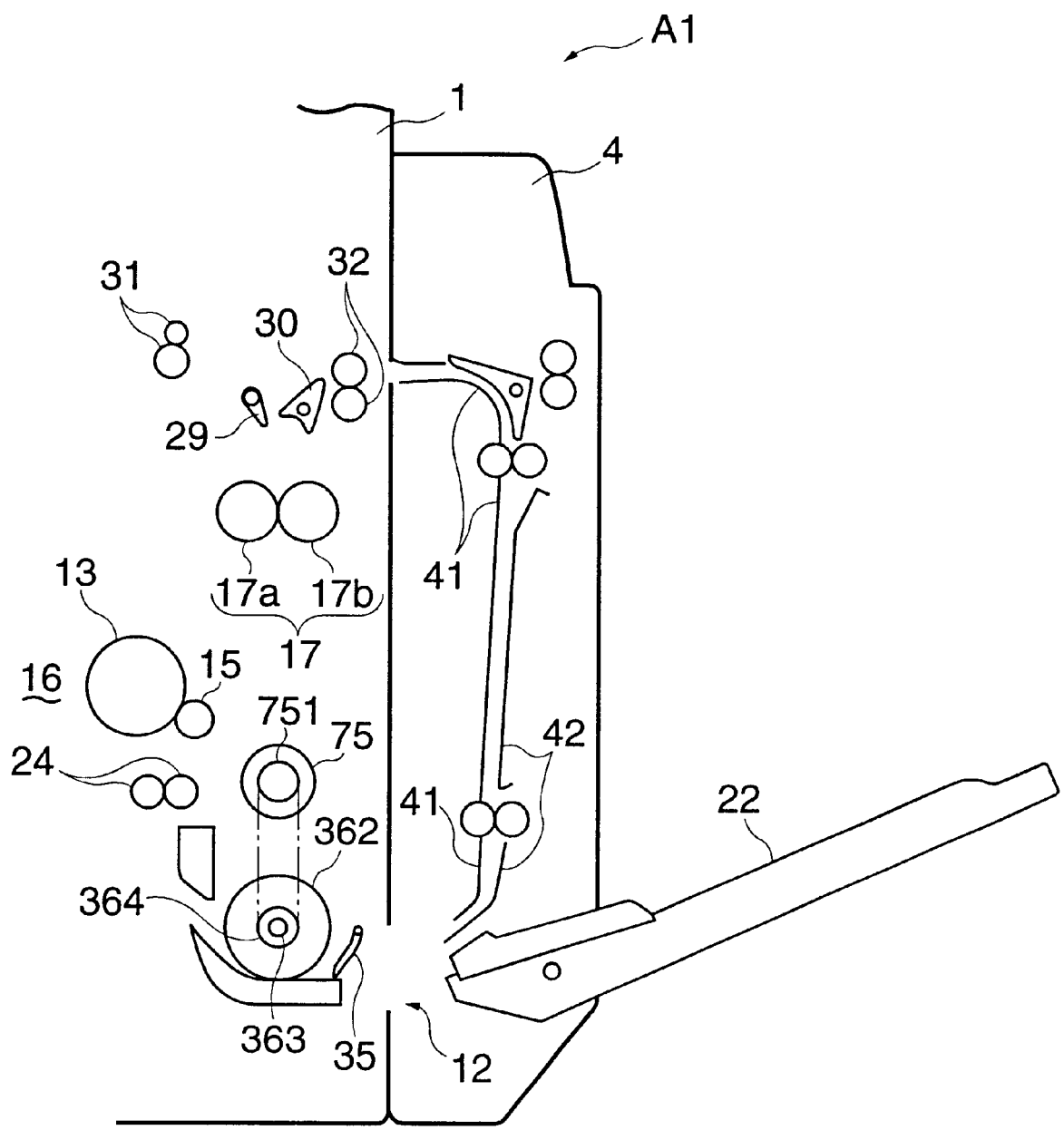
FIG. 9 is a fragmentary elevational view of a copying machine provided with manual feed means differing from that of the preferred embodiment.

FIG. 9 is a fragmentary elevational view of a copying machine A1 provided with manual feed means differing from that of the foregoing embodiment.

In FIG. 9, a feed roller 362 is a cylindrical roller and a roller shaft 363 is connected to a drive shaft 751 of a motor 75 (driver) via a one-way clutch 364. The one-way clutch 364 has a stopper which restricts the rotation of the feed roller 362 in one direction. When the feed roller 362 turns clockwise, or in a direction of feeding a sheet of paper P upstream, relative to the roller shaft 363, the one-way clutch 364 allows the feed roller 362 to rotate independently of the roller shaft 363.

In this construction, when a driving force is transmitted from the motor 75 and a force acting in a counterclockwise direction is applied to the feed roller 362 due to friction between the cylindrical surface of the feed roller 362 and the paper P, the one-way clutch 364 fixes the feed roller 362 with respect to the roller shaft 363 so that the feed roller 362 turns together with the roller shaft 363. As a consequence, the copying machine A1 of this variation performs the positive paper feed operation, and the leading edge of the paper P comes in contact with the registration roller pair 24 and stops there in a somewhat slackened state.

When the registration roller pair 24 begins to rotate, the paper P is advanced toward the image forming assembly 16. Although a trailing edge portion of the paper P is still pressed by the feed roller 362 at this point, the one-way clutch 364 sets the feed roller 362 free to rotate relative to the roller shaft 363 when the paper P is pulled by the registration roller pair 24, and as a consequence, the trailing edge portion of the paper P is released and the paper P is further transferred upstream. This is how the copying machine A1 of this variation performs the negative paper feed operation.

In this variation of the preferred embodiment, the paper feed control block 64 performs the following functions:

(a) The function of initiating the positive paper feed operation in the manual feed mode, wherein if the start button 72 is pressed after it has been judged that a sheet of paper P is present at the manual feeding port 12, the driver 75 is activated to feed the paper P by the feed roller 362;

(b) The function of initiating the positive paper feed operation in the double-sided copying mode, wherein when a specified period of time elapses after it has been judged that a sheet of paper P is present at the manual feeding port 12, the driver 75 is activated to feed the paper P by the feed roller 362; and (c) The function of stopping the rotation of the feed roller 362 when the registration roller pair 24 has begun rotating, and switching the paper transport means from the positive paper feed operation to the negative paper feed operation.

It is possible to properly perform the positive and negative paper feed operations as is the case with the foregoing preferred embodiment by using the cylindrical feed roller 362 provided with the one-way clutch 364.

The copying machine A1 of the foregoing embodiment is constructed such that the reversible paper transport unit 4 is fitted to its main body 1 after removing the manual feed tray 51 from the main body 1 as shown in FIG. 3. This is because the manual feeding port 12 is closed by the manual feed tray 51 if the reversible paper transport unit 4 is fitted to the main body 1 of the copying machine A1 with the manual feed tray 51 retracted in the side wall of the main body 1 as the manual feed tray 22 is retracted in the side wall of the reversible paper transport unit 4.

According to a second variation of the embodiment, a manual feed tray 52 attached to the main body 1 of the copying machine A1 has a slot 55 at a position corresponding to the manual feeding port 12. With this manual feed tray 52, the manual feeding port 12 will not be closed even when the manual feed tray 52 is retracted in the main body 1 of the copying machine A1. As a consequence, it will no longer be necessary to remove the manual feed tray 52 when fitting the reversible paper transport unit 4 to the main body 1 of the copying machine A1.

Figure 10:
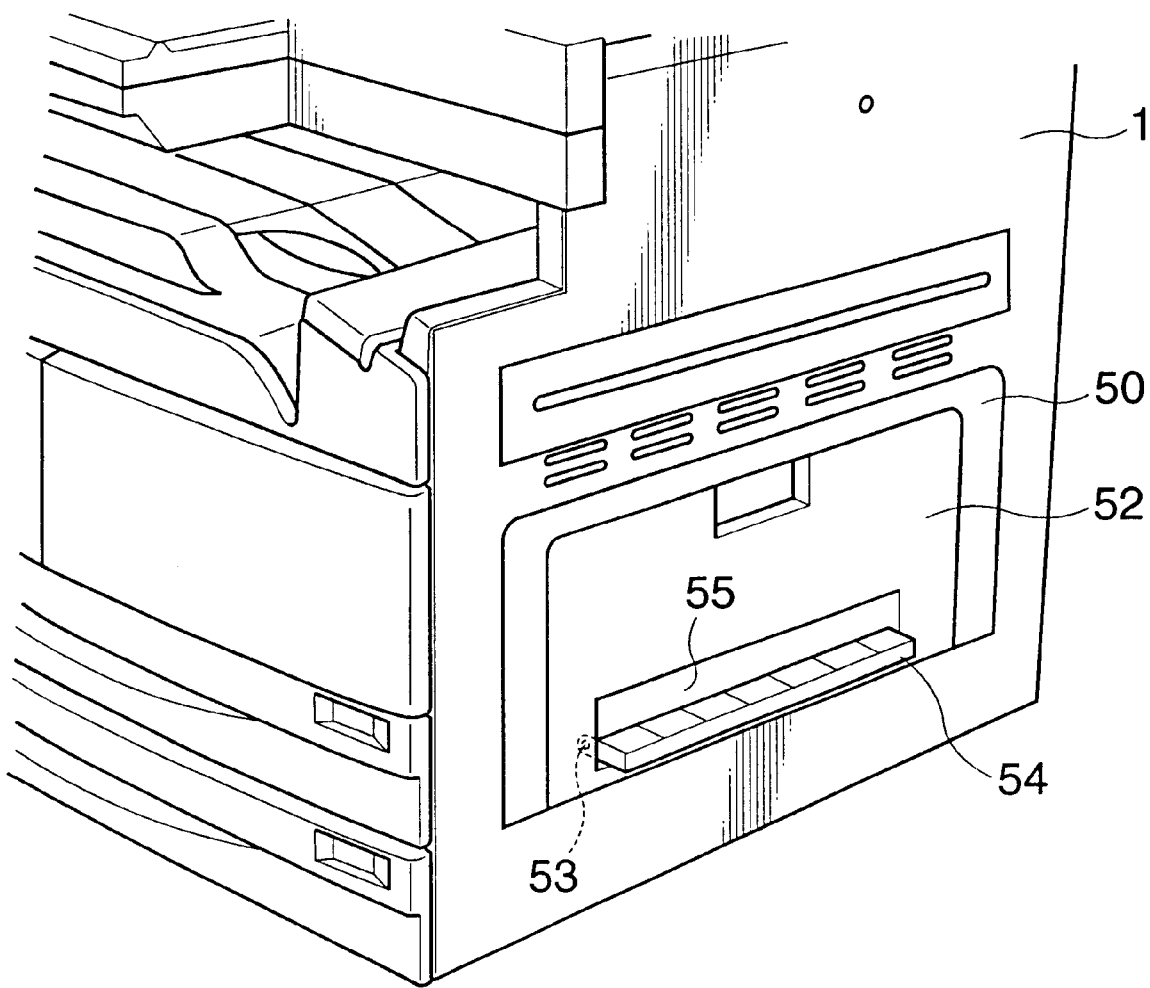
FIG. 10 is a perspective diagram showing a state in which the manual feed tray having a slot is retracted in the main body of the copying machine.
Figure 11:
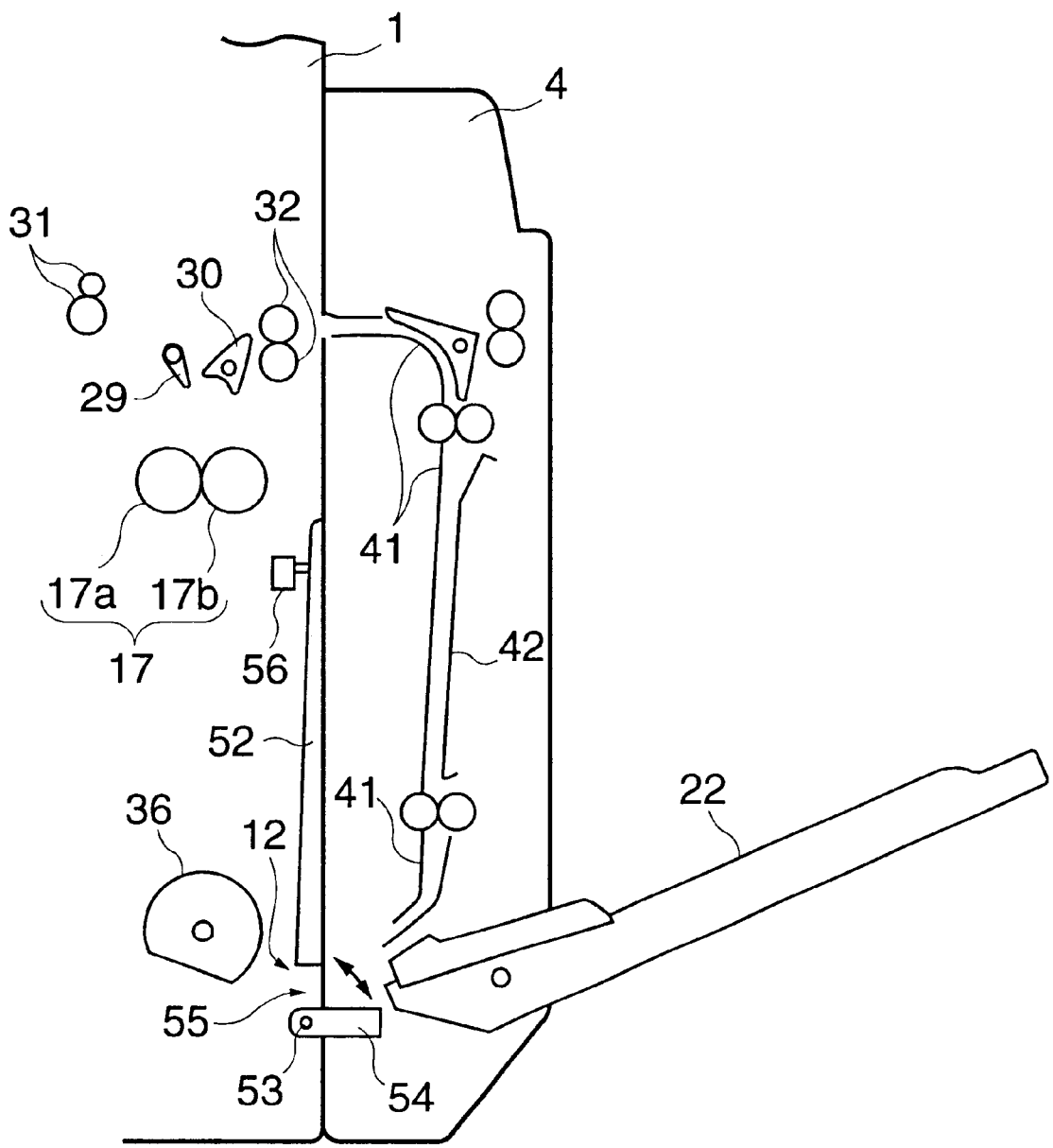
FIG. 11 is a fragmentary elevational view showing a state in which the reversible paper transport unit is fitted to the main body of the copying machine shown in FIG. 10.

FIG. 10 is a perspective diagram showing a state in which the manual feed tray 52 having the slot 55 is retracted in the main body 1 of the copying machine A1, and FIG. 11 is a fragmentary elevational view showing a state in which the reversible paper transport unit 4 is fitted to the main body 1 of the copying machine A1 shown in FIG. 10.

The main body 1 of the copying machine A1 of this variation is provided with the manual feed tray 52 and a detecting switch 56 as shown in FIG. 11. This manual feed tray 52 has a swing-out flap 54 which can be swung outward about a pivot 53 from a position retracted in the main body 1 of the copying machine A1 as well as the slot 55 which opens when the swing-out flap 54 is swung outward, as shown in FIG. 10. This swing-out flap 54 functions as a paper receiver for receiving the paper fed from the paper return device fitted to the main body of the apparatus. This slot 55 is formed at the position corresponding to the manual feeding port 12 in the main body 1 of the copying machine A1 as shown in FIG. 11 and, therefore, the slot 55 is not closed even when the manual feed tray 52 is retracted in the main body 1. The detecting switch 56 is disposed at a position where the manual feed tray 52 is retracted. When the manual feed tray 52 is retracted in the main body 1 of the copying machine A1, the detecting switch 56 becomes ON to sense that the manual feed tray 52 has been retracted.

In this variation of the preferred embodiment, the controller 60 serves the function of a tray position sensing block which judges whether the manual feed tray 52 is retracted into the main body 1 of the copying machine A1 according to on/off states of the detecting switch 56 which is shown by broken lines in FIG. 5. The controller 60 performs the function of the paper refeed control block 64 which controls the individual elements of the reversible paper transport unit 4 only when it is fitted to the main body 1 of the copying machine A1 and the manual feed tray 22 is retracted into the reversible paper transport unit 4.

While the copying machine A1 of the foregoing preferred embodiment is provided with the detecting switch 37 for sensing whether the manual feed tray 22 is retracted in the side wall of the reversible paper transport unit 4 and the controller 60 judges that it is impossible to set any paper P by manual operation and thus the second precondition is satisfied when the tray position sensing signal output from the detecting switch 37 is ON (or when the manual feed tray 22 is in its retracted position), means for judging whether the second precondition is satisfied is not limited to this method. As an alternative, a judgment as to whether the second precondition is satisfied can be made by sensing the presence of paper P set on the manual feed tray 22, if any, with reference to the paper sensing signal output from the detecting switch 35, for example.

Although the copying machine A1 of the foregoing embodiment is constructed such that the paper feed operation by the feed roller 36 is automatically commenced when a specified period of time elapses after it has been judged that a sheet of paper P is present at the manual feeding port 12 in the double-sided copying mode, this form of control is applicable to a case where the original document is fed automatically. The copying machine A1 may be constructed such that if the original is not fed automatically, the feed roller 36 begins the paper feed operation when the start button 72 is pressed with one side of the original placed on the original glass plate 3 after the opposite side of the original has been copied and it has been judged that a sheet of paper P is present at the manual feeding port 12.

While the reversible paper transport unit 4 is made detachable from the copying machine A1 in the foregoing preferred embodiment, it need not necessarily be detachable but may be permanently fixed to the copying machine A1.

While the invention has been particularly shown and described with respect to the preferred embodiments thereof, it will be understood by those skilled in the art that the foregoing and other changes in form and details may be made therein without departing from the spirit and scope of the invention, which should be limited only by the scope of the appended claims.

What is claimed is:

1. An image forming apparatus comprising;
   a main body having a paper feeding port through which paper passes from outside of said main body into said main body and a paper output port through which paper passes out of said main body;
   an image former arranged inside said main body for forming an image on paper;
   a paper feeder for feeding paper inserted into said paper feeding port toward said image former;
   a paper ejector for ejecting the paper carrying the image formed by said image former out of said main body through said paper output port;
   a paper sensor which senses the paper inserted into said paper feeding port and outputs a paper sensing signal, said paper sensor being arranged proximate said paper feeding port and before said paper feeder in a conveying direction of the paper,
   a driver for driving said paper feeder;
   a paper return device for feeding the paper ejected from said paper output port back to said paper feeding port;
   a discriminator for judging whether said paper return device is in an operating condition;
   a paper feed controller for controlling said driver such that said paper feeder initiates a paper feed operation when the paper sensing signal is output while said paper return device is in the operating condition;
   a unit mounting portion formed in said main body, said paper return device being detachably mounted to said main body by means of said unit mounting portion; and
   a paper receiver for receiving the paper fed from said paper return device connected to said main body.

2. An image forming apparatus comprising:
   a main body having a paper feeding port through which paper passes from outside of said main body into said main body and a paper output port through which paper passes out of said main body;
   an image former arranged inside said main body for forming an image on paper;
   a paper feeder for feeding paper inserted into said paper feeding port toward said image former;
   a paper ejector for ejecting the paper carrying the image formed by said image former out of said main body through said paper output port;
   a paper sensor which senses the paper inserted into said paper feeding port and outputs a paper sensing signal, said paper sensor being arranged proximate said paper feeding port and before said paper feeder in a conveying direction of the paper,
   a driver for driving said paper feeder;
   a paper return device for feeding the paper ejected from said paper output port back to said paper feeding port;
   a discriminator for judging whether said paper return device is in an operating condition; and
   a paper feed controller for controlling said driver such that said paper feeder initiates a paper feed operation when the paper sensing signal is output while said paper return device is in the operating condition, wherein said paper feeder is a primary paper feeder, further comprising a secondary paper feeder disposed between said primary paper feeder and said image former for further advancing the paper fed from said primary paper feeder toward said image former, wherein said primary paper feeder selectively performs a positive paper feed operation, in which said primary paper feeder feeds the paper inserted into said paper feeding port up to said secondary paper feeder by applying a force to the paper, or a negative paper feed operation, in which said primary paper feeder allows the paper to be further advanced by said secondary paper feeder without applying a force to the paper, and wherein said paper feed controller commences the paper feed operation by first initiating the positive paper feed operation.

3. The image forming apparatus according to claim 2, wherein said primary paper feeder comprises a roller having a semicircular cross-sectional shape with part of a curved outer surface of said roller cut to form a flat portion, and said paper feed controller performs the positive paper feed operation by causing the curved outer surface, except the flat portion, of said roller to contact the paper and performs the negative paper feed operation by causing said driver to halt with the flat portion of said roller directed toward the paper when said secondary paper feeder advances the paper toward said image former.

4. The image forming apparatus according to claim 2, further comprising a one-way clutch arranged between said driver and said primary paper feeder, wherein said one-way clutch disengages said primary paper feeder from said driver when the paper is pulled by said secondary paper feeder as it advances the paper toward said image former, and said paper feed controller performs the positive paper feed operation by activating said driver and performs the negative paper feed operation by deactivating said driver when said secondary paper feeder advances the paper toward said image former.

5. An image forming apparatus comprising:
   a main body having a paper feeding port through which paper passes from outside of said main body into said main body and a paper output port through which paper passes out of said main body;
   an image former arranged inside said main body for forming an image on paper;
   a paper feeder for feeding paper inserted into said paper feeding port toward said image former;
   a paper ejector for ejecting the paper image formed by said image former out of said main body through said paper output port;

a paper sensor which senses the paper inserted into said paper feeding port and outputs a paper sensing signal, said paper sensor being arranged proximate said paper feeding port and before said paper feeder in a conveying direction of the paper;

a driver for driving said paper feeder, a paper return device for feeding the paper ejected from said paper output port back to said paper feeding port;

a discriminator for judging whether said paper return device is in an operating condition;

a paper feed controller for controlling said driver such that said paper feeder initiates a paper feed operation when the paper sensing signal is output while said paper return device is in the operating condition; and a manual feed tray on which a stack of paper is placed from externally of the apparatus for guiding a paper to said paper feeding port, wherein said paper feed controller controls said driver such that said paper feeder initiates a paper feed operation when the paper sensing signal is output while said paper return device is not in the operative condition.

6. An image forming apparatus comprising:

a main body having a paper feeding port through which paper passes from outside of said main body into said main body and a paper output port through which paper passes out of said main body;

an image former arranged inside said main body for forming an image on paper;

a paper feeder for feeding paper insert into said paper feeding port toward said image former;

a paper ejector for ejecting the paper carrying the image formed by said image former out of said main body through said paper output port;

a paper sensor which senses the paper inserted into said paper feeding port and outputs a paper sensing signal, said paper sensor being arranged proximate said paper feeding port and before said paper feeder in a conveying direction of the paper;

a driver for driving said paper feeder, a paper return device for feeding the paper ejected from said paper output port back to said paper feeding port;

a discriminator for judging whether said paper return device is in an opening condition;

a paper feed controller for controlling said driver such that said paper feeder initiates a paper feed operation when the paper sensing signal is output while said paper return device is in the operating condition; and a manual feed tray on which a stack of paper is placed from externally of the apparatus for guiding a paper to said paper feeding port, wherein said manual feed tray is pivotally connected to said paper return device.

7. The image forming apparatus according to claim 6, wherein said controller sets said paper return device in an inoperable condition when said manual feed tray is opened with respect to said paper return device.

8. The image forming apparatus according to claim 6, wherein said controller sets said paper return device in an operable condition when said manual feed tray is closed with respect to said paper return device.

9. The image forming apparatus according to claim 6, wherein said controller sets said paper return device in an inoperable condition when a paper on said manual feed tray is detected.

10. The image forming apparatus according to claim 6, wherein said controller sets said paper return device in an operable condition when a paper on said manual feed tray is not detected.

11. An image forming apparatus comprising:

a main body having a paper feeding port through which paper passes from outside of said main body into said main body and a paper output port through which paper passes out of said main body;

an image former arranged inside said main body for forming an image on paper;

a paper feeder for feeding paper inserted into said paper feeding port toward said image former;

a paper ejector for ejecting the paper carrying the image formed by said image former out of said main body through said paper output port;

a paper sensor which senses the paper inserted into said paper feeding port and outputs a paper sensing signal, said paper sensor being arranged proximate said paper feeding port and before said paper feeder in a conveying direction of the paper;

a driver for driving said paper feeder;

a paper return device for feeding the paper ejected from said paper output port back to said paper feeding port;

a discriminator for judging whether said paper return device is in an operating condition; and a paper feed controller for controlling said driver such that said paper feeder initiates a paper feed operation when the paper sensing signal is output while said paper return device is in the operating condition, wherein said paper sensor is arranged in relation to said paper return device to detect paper being fed through said paper return device from said paper output port to said paper feeding port.

12. An image forming apparatus comprising:

a main body having a paper feeding port through which paper passes from outside of said main body into said main body and a paper output port through which paper passes out of said main body;

an image former arranged inside said main body for forming an image on paper;

a paper feeder for feeding paper inserted into said paper feeding port toward said image former;

a paper ejector for ejecting the paper carrying the image formed by said image former out of said main body through said paper output port;

a paper sensor which senses the paper inserted into said paper feeding port and outputs a paper sensing signal, said paper sensor being arranged proximate said paper feeding port and before said paper feeder in a conveying direction of the paper;

a driver for driving said paper feeder;

a paper return device for feeding the paper ejected from said paper output port back to said paper feeding port;

a discriminator for judging whether said paper return device is in an operating condition;

a paper feed controller for controlling said driver such that said paper feeder initiates a paper feed operation when the paper sensing signal is output while said paper return device is in the operating condition; and a manual feed tray on which a stack of paper is placed from externally of the apparatus for guiding a paper to said paper feeding port, wherein said paper sensor is arranged in relation to said manual feed tray detect paper loaded in said manual feed tray.

13. An image forming apparatus comprising:

a main body having a paper feeding port through which paper passes from outside of said main body into said main body and a paper output port through which paper passes out of said main body;

an image former arranged inside said main body for forming an image on paper, a paper feeder for feeding paper inserted into said paper feeding port toward said image former;

a paper ejector for ejecting the paper carrying the image formed by said image former out of said main body through said paper output port;

a paper sensor which senses the paper inserted into said paper feeding port and outputs a paper sensing signal, said paper sensor being arranged proximate said paper feeding port and before said paper feeder in a conveying direction of the paper;

a driver for driving said paper feeder;

a paper return device for feeding the paper ejected from said paper output port back to said paper feeding port;

a discriminator for judging whether said paper return device is in an operating condition;

a paper feed controller for controlling said driver such that said paper feeder initiates a paper feed operation when the paper sensing signal is output while said paper return device is in the operating condition; and a manual feed tray on which a stack of paper is placed from externally of the apparatus for guiding a paper to said paper feeding port, wherein said paper sensor is arranged in relation to said paper return device and said manual feed tray to detect paper being fed through said paper return device from said paper output port to said paper feeding port and to detect paper loaded in said manual feed tray.

14. An image forming apparatus comprising:

a main body having a paper feeding port through which paper passes from outside of said main body into said main body said a paper output port through which paper passes out of said main body;

an image former arranged inside said main body for forming an image on paper;

a paper feeder for feeding paper inserted into said paper feeding port toward said image former;

a paper ejector for ejecting the paper carrying the image formed by said image former out of said main body through said paper output port;

a paper sensor which senses th paper inserted into said paper feeding port and outputs a paper sensing signal, said paper sensor being arranged proximate said paper feeding port and before said paper feeder in a conveying direction of the paper, a driver for driving said paper feeder;

a paper return device for feeding the paper ejected from said paper output port back to said paper feeding port;

a discriminator for judging whether said paper return device is in an operating condition; and a paper feed controller for controlling said driver such that said paper feeder initiates a paper feed operation when the paper sensing signal is output while said paper return device is in the operating condition, wherein said paper sensor is arranged between said paper feeding port and said paper feeder.

15. An image forming apparatus, comprising:

a main body having a paper feeding port through which paper passes into said main body and a paper output port through which paper passes out of said main body;

an image former arranged inside said main body for forming an image on paper;

a paper feeder for feeding paper inserted into said paper feeding port toward said image former;

a paper ejector for ejecting paper carrying the image formed by said image former out of said main body through said paper output port;

a paper sensor which senses the paper inserted into said paper feeding port and outputs a paper sensing signal;

a driver for driving said paper feeder;

a paper return device for feeding the paper ejected from said paper output port back to said paper feeding port;

a discriminator for judging whether said paper return device is in an operating condition;

a paper feed controller for controlling said driver so that said paper feeder initiates a paper feed operation when the paper sensing signal is output while said paper return device is in the operating condition;

a unit mounting portion formed in said main body for detachably mounting said paper return device to said main body such that said paper return device is selectively detachable from said main body; and a paper receiver for receiving the paper fed from said paper return device when situated in connection with said main body.

16. An image forming apparatus, comprising:

a main body having a paper feeding port through which paper passes into said main body and a paper output port through which paper passes out of said main body;

an image former arranged inside said main body for forming an image on paper;

a primary paper feeder for feeding paper inserted into said paper feeding port toward said image former;

a paper ejector for ejecting paper carrying the image formed by said image former out of said main body through said paper output port;

a paper sensor which senses the paper inserted into said paper feeding port and outputs a paper sensing signal;

a driver for driving said primary paper feeder;

a paper return device for feeding the paper ejected from said paper output port back to said paper feeding port;

a discriminator for judging whether said paper return device is in an operating condition;

a paper feed controller for controlling said driver so that said primary paper feeder initiates a paper feed operation when the paper sensing signal is output while said paper return device is in the operating condition; and a secondary paper feeder arranged between said primary paper feeder and said image former for further advancing the paper fed from said primary paper feeder toward said image former, said primary paper feeder selectively performing a positive paper feed operation in which said primary paper feeder feeds the paper inserted into said paper feeding port up to said secondary paper feeder by applying a force to the paper, or a negative paper feed operation in which said primary paper feeder allows the paper to be further advanced by said secondary paper feeder without applying a force to the paper, and said paper feed controller commencing paper feed operation by first initiating the positive paper feed operation.

17. The image forming apparatus according to claim 16, wherein said paper feeder includes a roller having a semicircular cross-sectional shape with part of a curved outer surface of said roller cut to form a flat portion, and said paper feed controller performs the positive paper feed operation by causing said curved outer surface, except the flat portion, of said roller to contact the paper and performs the negative paper feed operation by causing said driver to halt with the flat portion of said roller directed toward the paper when said secondary paper feeder advances the paper toward said image former.

18. The image forming apparatus according to claim 16, further comprising a one-way clutch arranged between said driver and said paper feeder, said one-way clutch disengaging said paper feeder from said driver when the paper is pulled by said secondary paper feeder as it advances the paper toward said image former, and said paper feed controller performs the positive paper feed operation by activating said driver and performs the negative paper feed operation by deactivating said driver when said secondary paper feeder advances the paper toward said image former.

19. An image forming apparatus, comprising:

a main body having a paper feeding port through which paper passes into said main body and a paper output port through which paper passes out of said main body;

an image former arranged inside said main body for forming an image on paper;

a paper feeder for feeding paper inserted into said paper feeding port toward said image former;

a paper ejector for ejecting paper carrying the image formed by said image former out of said main body through said paper output port;

a paper sensor which senses the paper inserted into said paper feeding port and outputs a paper sensing signal;

a driver for driving said paper feeder;

a paper return device for feeding the paper ejected from said paper output port back to said paper feeding port;

a discriminator for judging whether said paper return device is in an operating condition;

a paper feed controller for controlling said driver so that said paper feeder initiates a paper feed operation when the paper sensing signal is output while said paper return device is in the operating condition; and a manual feed tray on which a stack of paper is placed from externally of the apparatus for guiding a paper to said paper feeding port, said paper feed controller controlling said driver such that said paper feeder initiates a paper feed operation when the paper sensing signal is output while said paper return device is not in the operative condition.

20. An image forming apparatus, comprising:

a main body having a paper feeding port through which paper passes into said main body and a paper output port through which paper passes out of said main body;

an image former arranged inside said main body for forming an image on paper;

a paper feeder for feeding pap inserted into said paper feeding port toward said image former;

a paper ejector for ejecting paper carrying the image formed by said image former out of said main body through said paper output port;

a paper sensor which senses the paper inserted into said paper feeding port and outputs a paper sensing signal;

a driver for driving said paper feeder;

a paper return device for feeding the paper ejected from said paper output port back to said paper feeding port;

a discriminator for judging whether said paper return device is in an operating condition;

a paper feed controller for contolling said driver so that said paper feeder initiates a paper feed operation when tie paper sensing signal is output while said paper return device is in the operating condition; and a manual feed tray on which a stack of paper is placed from externally of the apparatus for guiding a paper to said paper feeding port, said manual feed tray being pivotally connected to said paper return device, wherein said controller sets said paper return device in an inoperable condition when said manual feed tray is opened with respect to said paper return device.

21. An image forming apparatus, comprising:

a main body having a paper feeding port through which paper passes into said main body and a paper output port through which paper passes out of said main body;

an image former arranged inside said main body for forming an image on paper;

a paper feeder for feeding paper inserted into said paper feeding port toward said image former;

a paper ejector for ejecting paper carrying the image formed by said image former out of said main body through said paper output port;

a paper sensor which senses the paper inserted into said paper feeding port and outputs a paper sensing signal;

a driver for driving said paper feeder:

a paper return device for feeding the paper ejected from said paper output port back to said paper feeding port;

a discriminator for judging whether said paper return device is in an operating condition;

a paper feed controller for controlling said driver so that said paper feeder initiates a paper feed operation when the paper sensing signal is output while said paper return device is in the operating condition; and a manual feed tray on which a stack of paper is placed from externally of the apparatus for guiding a paper to said paper feeding port, said manual feed tray being pivotally connected to said paper return device, wherein said controller sets said paper return device in an operable condition when said manual feed tray is closed with respect to said paper return device.

22. An image forming apparatus, comprising:

a main body having a paper feeding port through which paper passes into said main body and a paper output port through which paper passes out of said main body;

an image former arranged inside said main body for forming an image on paper;

a paper feeder for feeding paper inserted into said paper feeding port toward said image former;

a paper ejector for ejecting paper carrying the image formed by said image former out of said main body through said paper output port;

a paper sensor which senses the paper inserted into said paper feeding port and outputs a paper sensing signal;

a driver for driving said paper feeder;

a paper return device for feeding the paper ejected from said paper output port back to said paper feeding port;

a discriminator for judging whether said paper return device is in an operating condition;

a paper feed controller for controlling said driver so that said paper feeder initiates a paper feed operation when the paper sensing signal is output while said paper return device is in the operating condition; and a manual feed tray on which a stack of paper is placed from externally of the apparatus for guiding a paper to said paper feeding port said manual feed tray being pivotally connected to said paper return device, wherein said controller sets said paper return device in an inoperable condition when a paper on said manual feed tray is detected.

23. An image forming apparatus, comprising:

a main body having a paper feeding port through which paper passes into said main body and a paper output port through which paper passes out of said main body;

an image former arranged inside said main body for forming an image on paper;

a paper feeder for feeding paper inserted into said paper feeding port toward said image former;

a paper ejector for ejecting paper carrying the image formed by said image former out of said main body through said paper output port;

a paper sensor which senses the paper inserted into said paper feeding port and outputs a paper sensing signal;

a driver for driving said paper feeder;

a paper return device for feeding the paper ejected from said paper output port back to said paper feeding port;

a discriminator for judging whether said paper return device is in an operating condition;

a paper feed controller for controlling said driver so that said paper feeder initiates a paper feed operation when the paper sensing signal is output while said paper return device is in the operating condition; and a manual feed tray on which a stack of paper is placed from externally of the apparatus for guiding a paper to said paper feeding port, said manual feed tray being pivotally connected to said paper return device, wherein said controller sets said paper return device in an operable condition when a paper on said manual feed tray is not detected.

* * * * *